Figure 1:
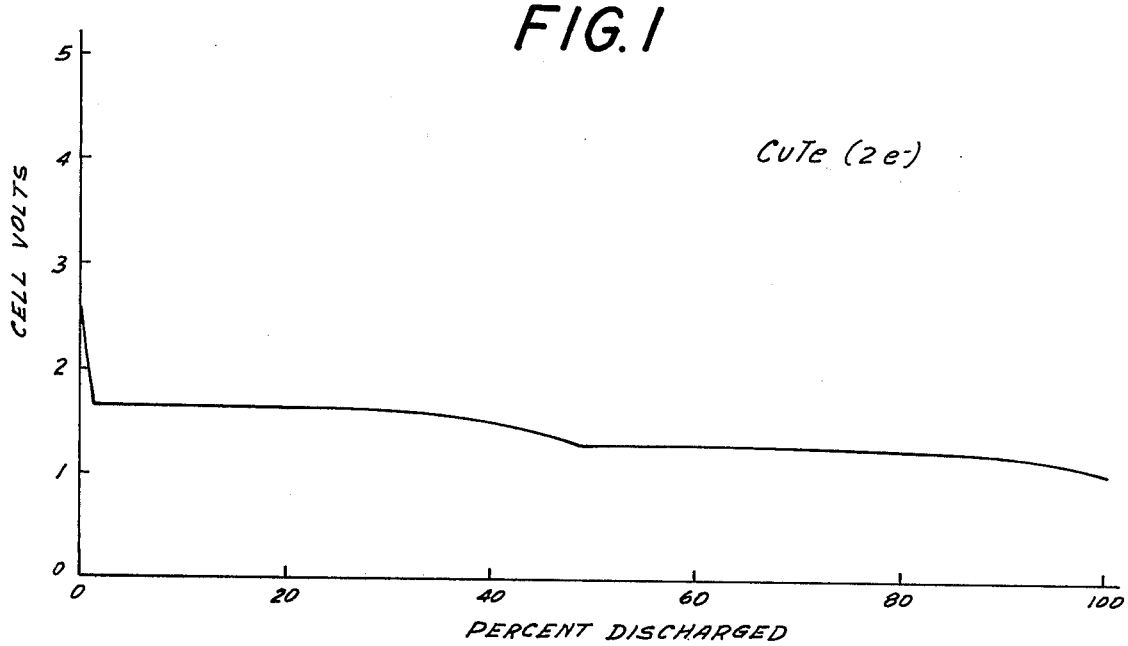

United States Patent [19]
Dey et al.

[11] 3,877,988
[45] Apr. 15, 1975

[54] LITHIUM-METAL TELLURIDE ORGANIC ELECTROLYTE CELL

[75] Inventors: Arabinda N. Dey, Needham; Per Bro, Andover, both of Mass.

[73] Assignee: P. R. Mallory and Co., Inc., Indianapolis, Ind.

[22] Filed: Mar. 21, 1973

[21] Appl. No.: 355,861

[52] U.S. Cl............ 136/83 R; 136/100 R; 136/137; 136/154
[51] Int. Cl. .......................................... H01m 23/02
[58] Field of Search...... 136/83 R, 137, 154, 100 R, 136/100 M, 120, 20, 6 R, 6 LN, 86 A, 86 D, 136/86 R

[56] References Cited
UNITED STATES PATENTS

| | | | |
|---|---|---|---|
| 2,081,926 | 6/1937 | Gyuris | 136/83 R |
| 3,031,518 | 4/1962 | Werner et al. | 136/86 A |
| 3,294,587 | 12/1966 | LeDuc | 136/86 A |
| 3,647,549 | 3/1972 | Christie et al. | 136/83 R |
| 3,681,143 | 8/1972 | Dey | 136/83 R |
| 3,681,144 | 8/1972 | Dey et al. | 136/83 R |

*Primary Examiner*—Anthony Skapars
*Attorney, Agent, or Firm*—Robert Levine

[57] ABSTRACT

This invention relates to novel primary electric cells (with extremely flat discharge curves) comprising positive electrodes composed of metal tellurides wherein the metals are selected from the group consisting of silver, copper, iron, cobalt, nickel, mercury, thallium, lead, bismuth and the mixtures thereof, and the negative electrodes composed of light metals, said electrodes being disposed in an electrolyte comprising an organic solvent selected from the group consisting of tetrahydrofuran, N-nitrosodimethylamine, dimethyl sulfite, propylene carbonate, gamma-butyrolactone, acetonitrile, dimethyl sulfoxide, dimethyl formamide, and mixtures thereof, and having dissolved therein soluble salts of the metals, for example, the perchlorates, hexafluorophosphates, tetrafluoroborates, tetrachloroaluminates, hexafluoroarsenates of lithium.

12 Claims, 5 Drawing Figures

LITHIUM-METAL TELLURIDE ORGANIC ELECTROLYTE CELL

It has been discovered that metal tellurides with adequate electronic conductivity were useful depolarizers for the organic electrolyte lithium batteries. The materials were extremely stable in the organic electrolytes and could be discharged with approximately 100% coulombic efficiency. To our knowledge, the application of these materials in the battery field is totally novel. The objects of this invention are:

a. to provide organic electrolyte cells with novel depolarizers,
b. to provide cells with long shelf life and high material utilization efficiency,
c. to provide cells with exceptionally steady output throughout the life of the cell,
d. to provide cells with no spontaneous gassing under any circumstances.

The cathode fabrication, the anode fabrication, the electrolyte and the cell constructions were identical to that described in the example (1) of the invention disclosure of copending application U.S. Ser. No. 55,170 filed July 15, 1970. The performance of the various lithium-metal telluride cells is shown in Table 1. The discharge curves of the various systems are shown in FIG. 1 through 5. The systems are characterized with exceedingly stable operating voltage and high material utilization efficiency.

The invention is applicable (in addition to the areas mentioned in the scope of the invention disclosed in copending application U.S. Ser. No. 55,170 filed July 15, 1970) to all metal tellurides with electronic conductivity, e.g., tellurides of iron, cobalt, nickel, mercury, silver, copper, thallium, lead, bismuth. It is furthermore applicable to a variety of cell or battery structures, such as button cells, cylindrical cells or prismatic cells.

TABLE 1

Performance of Li-Metal Telluride Cells
(4.5 ma constant current, 1 ma/cm² CD, 20-30 hour rate)

| Cell | Initial O.C.V. | Practical O.C.V. | Average Operating Voltage | Material Utilization Efficiency | Assumed Cathode Reaction |
|---|---|---|---|---|---|
| Lithium/copper telluride | 3.26 | 1.7 | 1.4±0.2 | 99% | $CuTe + 2Li^+ + 2e \rightarrow Cu + Li_2Te$ |
| Lithium/silver telluride | 3.28 | 1.6 | 1.3±0.1 | 90% | $Ag_2Te + 2Li^+ + 2e \rightarrow 2Ag + Li_2Te$ |
| Lithium/thallium telluride | 2.90 | 1.8 | 1.3±0.3 | 90% | $Tl_2Te_3 + 6Li^+ + 6e \rightarrow 2Tl + 3 Li_2Te$ |
| Lithium/lead telluride | 2.0 | 1.3 | 1.05±0.05 | 100% | $PbTe + 2Li^+ + 2e \rightarrow Pb + Li_2Te$ |
| Lithium/bismuth telluride | 3.2 | 1.6 | 1.3±0.10 | 90% | $Bi_2Te_3 + 6Li^+ + 6e \rightarrow 2Bi + 3 Li_2Te$ |

Figure 2:
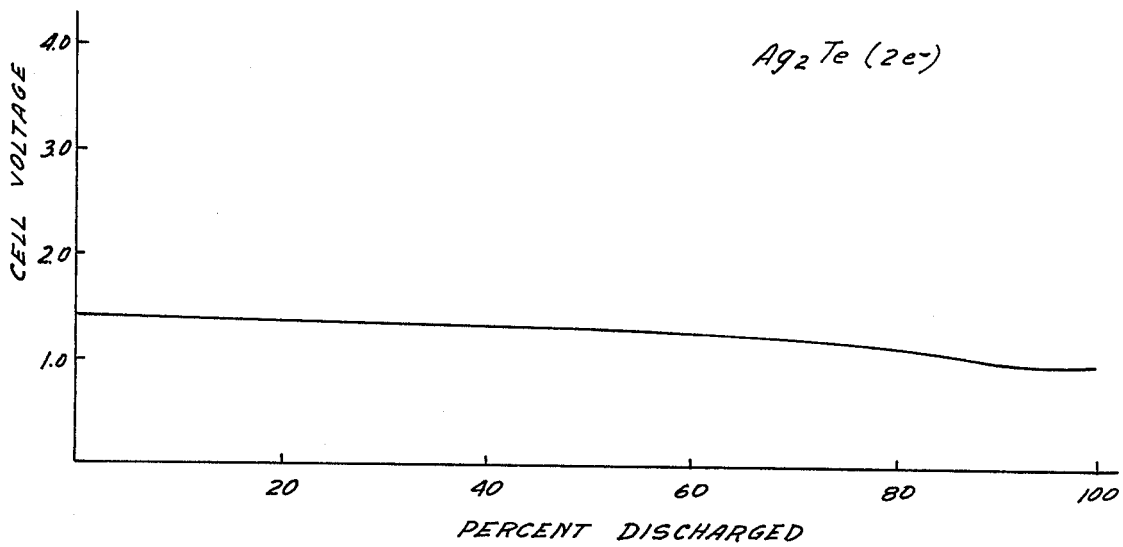
Figure 3:
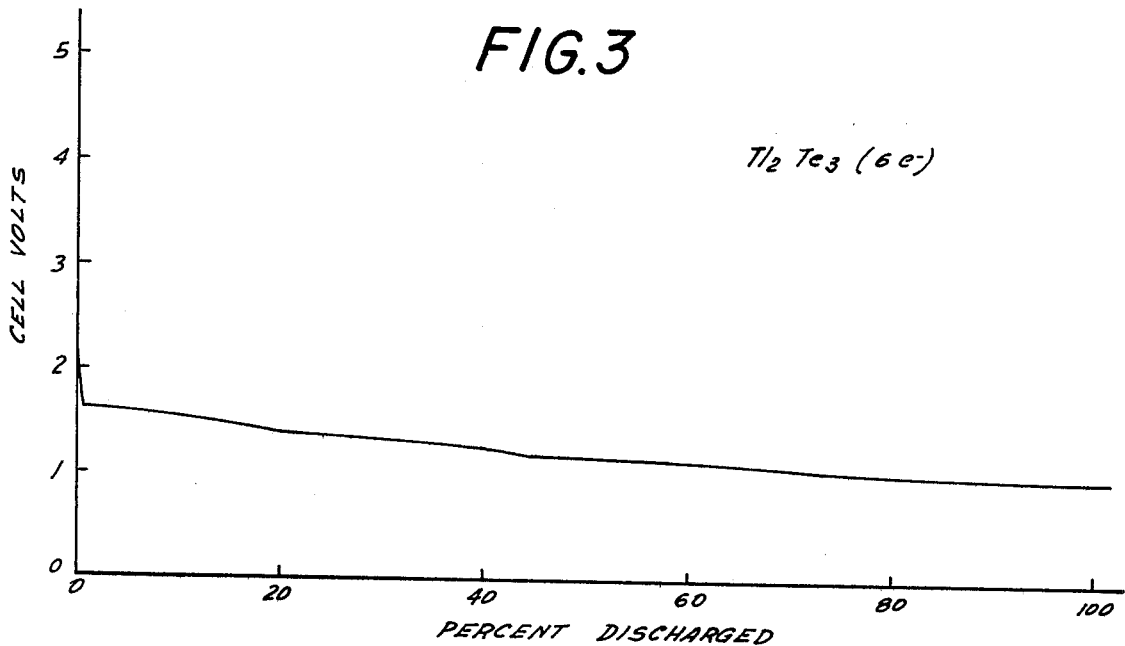
Figure 4:
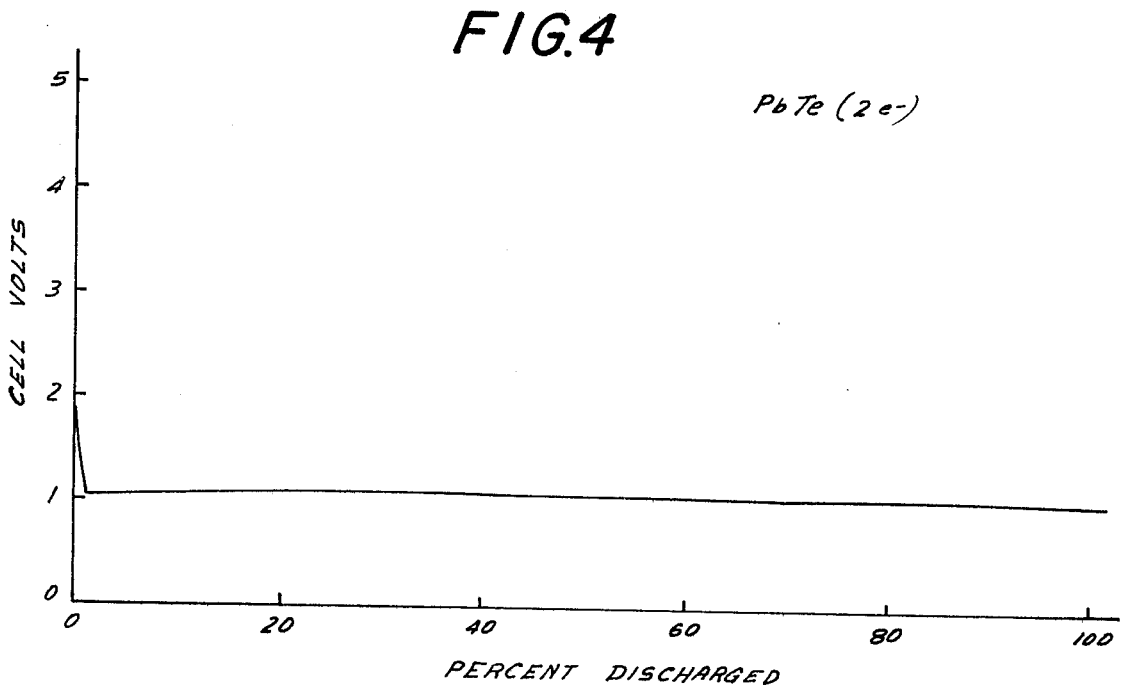
Figure 5:
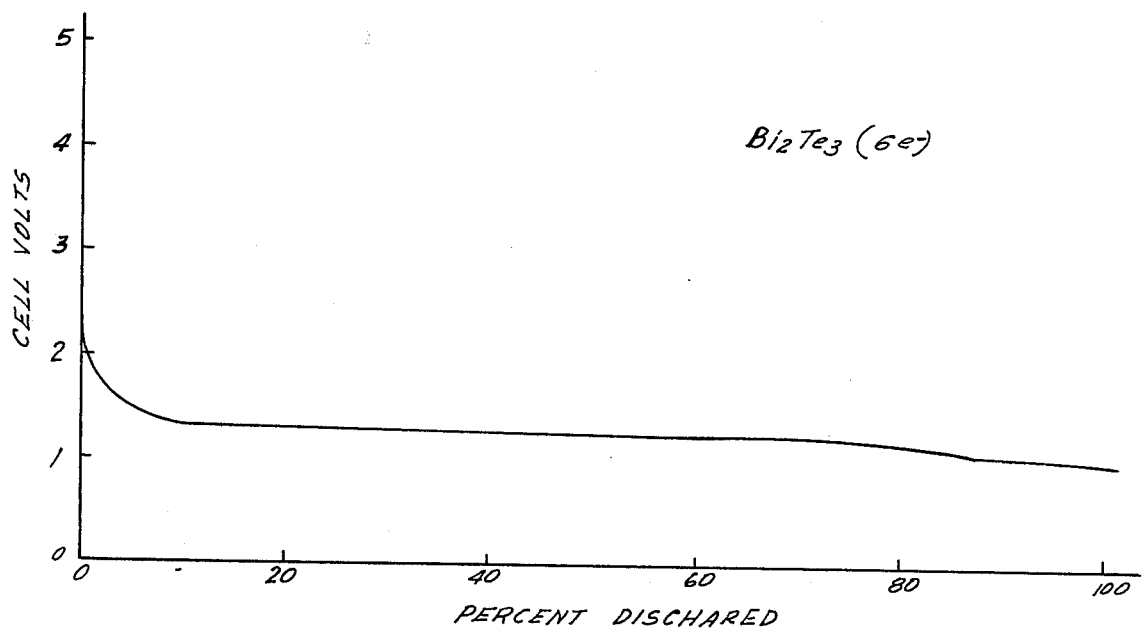

| Discharge Curve | |
|---|---|
| Lithium/copper telluride | FIG. 1 |
| Lithium/silver telluride | FIG. 2 |
| Lithium/thallium telluride | FIG. 3 |
| Lithium/lead telluride | FIG. 4 |
| Lithium/bismuth telluride | FIG. 5 |

What is claimed is:

1. A high energy density cell comprising a positive electrode selected from the group consisting of the tellurides of silver, copper, iron, cobalt, nickel, mercury, thallium, lead, and bismuth and the mixtures thereof; a negative electrode comprising a light metal selected from the group consisting of Li, Na, K, Be, Mg, Ca and Al, said electrodes being disposed in an electrolyte comprising an organic solvent selected from the group consisting of tetrahydrofuran, N-nitrosodimethylamine, dimethyl sulfite, propylene carbonate, gamma-butyrolactone, dimethyl carbonate, dimethoxyethane, acetonitrile, dimethyl sulfoxide, dimethyl formamide, and the mixtures thereof, and having dissolved therein soluble salts of the light metals, said salts selected from the group consisting of the perchlorates, hexafluorophosphates, tetrafluoroborates, tetrachloroaluminates, and hexafluoroarsenates of the light metals.

2. The cell in claim 1 wherein the electrolyte is composed of a solution of lithium perchlorate in tetrahydrofuran and the negative electrode is composed of lithium.

3. The cell in claim 2 wherein the positive electrode is composed of a mixture of silver telluride and a conductive diluent.

4. The cell in claim 2 wherein the positive electrode is composed of a mixture of copper telluride and a conductive diluent.

5. The cell in claim 2 wherein the positive electrode is composed of a mixture of iron telluride and a conductive diluent.

6. The cell in claim 2 wherein the positive electrode is composed of a mixture of cobalt telluride and a conductive diluent.

7. The cell in claim 2 wherein the positive electrode is composed of a mixture of nickel telluride and a conductive diluent.

8. The cell in claim 2 wherein the positive electrode is composed of a mixture of mercury telluride and a conductive diluent.

9. The cell in claim 2 wherein the positive electrode is composed of a mixture of thallium telluride and a conductive diluent.

10. The cell in claim 2 wherein the positive electrode is composed of a mixture of lead telluride and a conductive diluent.

11. The cell in claim 2 wherein the positive electrode is composed of a mixture of bismuth telluride and a conductive diluent.

12. The cell in claim 1 wherein the soluble salts are selected from the group consisting of the perchlorates, hexafluorophosphates, tetrafluoroborates, tetrachloroaluminates, and hexafluoroarsenates of lithium.

* * * * *